(12) United States Patent
Lo et al.

(10) Patent No.: US 7,133,374 B2
(45) Date of Patent: Nov. 7, 2006

(54) PROCESSING WIRELESS PACKETS TO REDUCE HOST POWER CONSUMPTION

(75) Inventors: Steve C. Lo, Portland, OR (US); Jeffrey L. Huckins, Chandler, AZ (US); Duncan M. Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 968 days.

(21) Appl. No.: 10/101,042

(22) Filed: Mar. 19, 2002

(65) Prior Publication Data

US 2003/0179725 A1 Sep. 25, 2003

(51) Int. Cl.
*H04B 7/185* (2006.01)

(52) U.S. Cl. ............... 370/318; 455/574; 455/13.4; 455/343.3

(58) Field of Classification Search .......... 455/574, 455/573, 343.1, 343.2, 343.3, 13.4; 713/323; 340/7.33
See application file for complete search history.

(56) References Cited

U.S. PATENT DOCUMENTS

| | | | |
|---|---|---|---|
| 5,560,021 A * | 9/1996 | Vook et al. ............... 713/323 |
| 6,018,642 A * | 1/2000 | Adachi ..................... 340/7.33 |
| 6,192,230 B1 * | 2/2001 | van Bokhorst et al. .. 455/343.3 |
| 6,463,307 B1 * | 10/2002 | Larsson et al. ............. 455/574 |
| 6,665,520 B1 * | 12/2003 | Romans ..................... 455/13.4 |
| 6,848,059 B1 * | 1/2005 | Bullman et al. ............ 713/323 |

OTHER PUBLICATIONS

"Information Technology—Telecommunications and Information Exchange Between Systems—Local and Metropolitan Area Networks—Specific Requirements—Part 11: Wireless LAN Medium Access Control (MAC) and Physical Layer (PHY) Specifications," LAN MAN Standards Committee of the IEEE Computer Society, ANS/IEEE Std. 801.11, 1999 Edition.

* cited by examiner

*Primary Examiner*—Hassan Kizou
*Assistant Examiner*—Albert T. Chou
(74) *Attorney, Agent, or Firm*—Trop, Pruner & Hu, P.C.

(57) ABSTRACT

An access point in a wireless network may receive packets over a wired network. The access point may be provided with instructions from the host to determine when to awaken the host from a reduced power consumption state in response to the receipt of a packet. Thus, the access point can enforce wake packet filtering rules while the host is maintained in a reduced power consumption state. This may reduce the power consumption of the host by avoiding the unnecessary awakening of the host every time a packet of little importance arrives over the network.

29 Claims, 6 Drawing Sheets

PROCESSING WIRELESS PACKETS TO REDUCE HOST POWER CONSUMPTION

BACKGROUND

This invention relates generally to wireless computer networks.

A host processor-based system may communicate with a variety of other devices to form a wireless network. A variety of peripherals and computer systems may be linked together through a wireless network. One protocol for establishing wireless links of this type is the IEEE Std. 802.11 (1999). In such a system, a host may receive packets over the network.

In some cases, the host may be a power consumption sensitive device. One example of such a device is a portable processor-based system that operates from a battery power source. To conserve power, the portable device may power down to a reduced power consumption state.

In the course of network operations, a large number of packets may be passed between various devices on the network. Some of these packets may be important and others may be less important. However, each time a packet is transmitted across the network to a given host, that host must receive the packet and determine whether the packet needs handling. If the host is in a reduced power consumption state this means that the host must transition from the reduced power consumption state to an increased power consumption state in order to handle the packet. Such transitions generally increase the power consumption of the host processor-based system.

Thus, there is a need for ways to reduce the power consumption of devices on wireless networks and particularly there is a need for ways to reduce the unnecessary interruptions of the host in reduced power consumption states.

DETAILED DESCRIPTION

Figure 1:
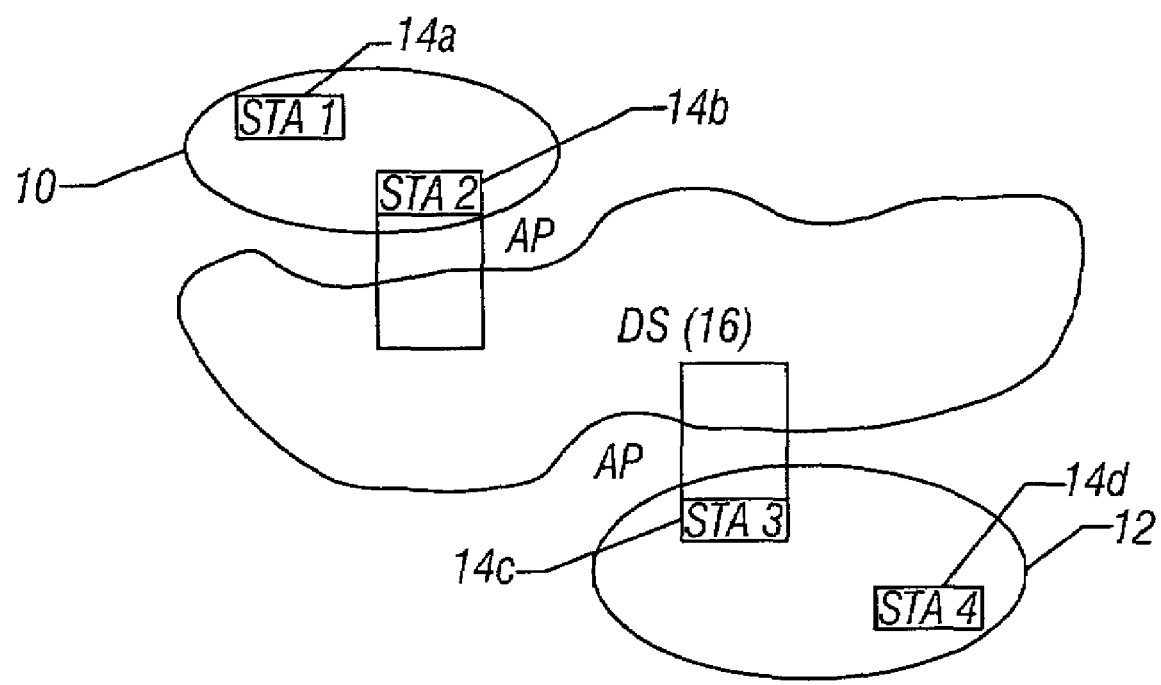
FIG. 1 is a schematic depiction of a wireless network in accordance with one embodiment of the present invention.

Referring to FIG. 1, a wireless network may include a plurality of basic service sets (BSS) 10 and 12 coupled through a distribution system (DS) 16. The distribution system 16 interconnects the basic service sets 10, 12 in integrated local area networks to create an extended service set. An extended service set is a set of one or more interconnected basic service sets and integrated local area networks that appears as a single basic service set to the logical link control layer at any station associated with one of those basic service sets.

Each basic service set 10 or 12 includes a set of stations (STAs) 14 controlled by a single coordination function. A coordination function is a logical function that determines when a station 14, operating within a basic service set 10 or 12, is permitted to transmit and may be able to receive protocol data units via a wireless medium.

The basic service sets 10 and 12 communicate with the distribution system 16 through access points provided by the stations 14b and 14c. An access point is any entity that has a station functionality while providing access to the distribution services via the wireless medium for associated stations. A station is a device that contains a medium access control (MAC) and a physical layer (PHY) interface to a wireless medium.

In accordance with one embodiment of the present invention, the system shown in FIG. 1 may operate in accordance with the IEEE 802.11 protocol which is set forth in IEEE Std. 802.11, 1999 Edition, available from the IEEE Standards Board, Piscataway, N.J. 08855.

Figure 2:
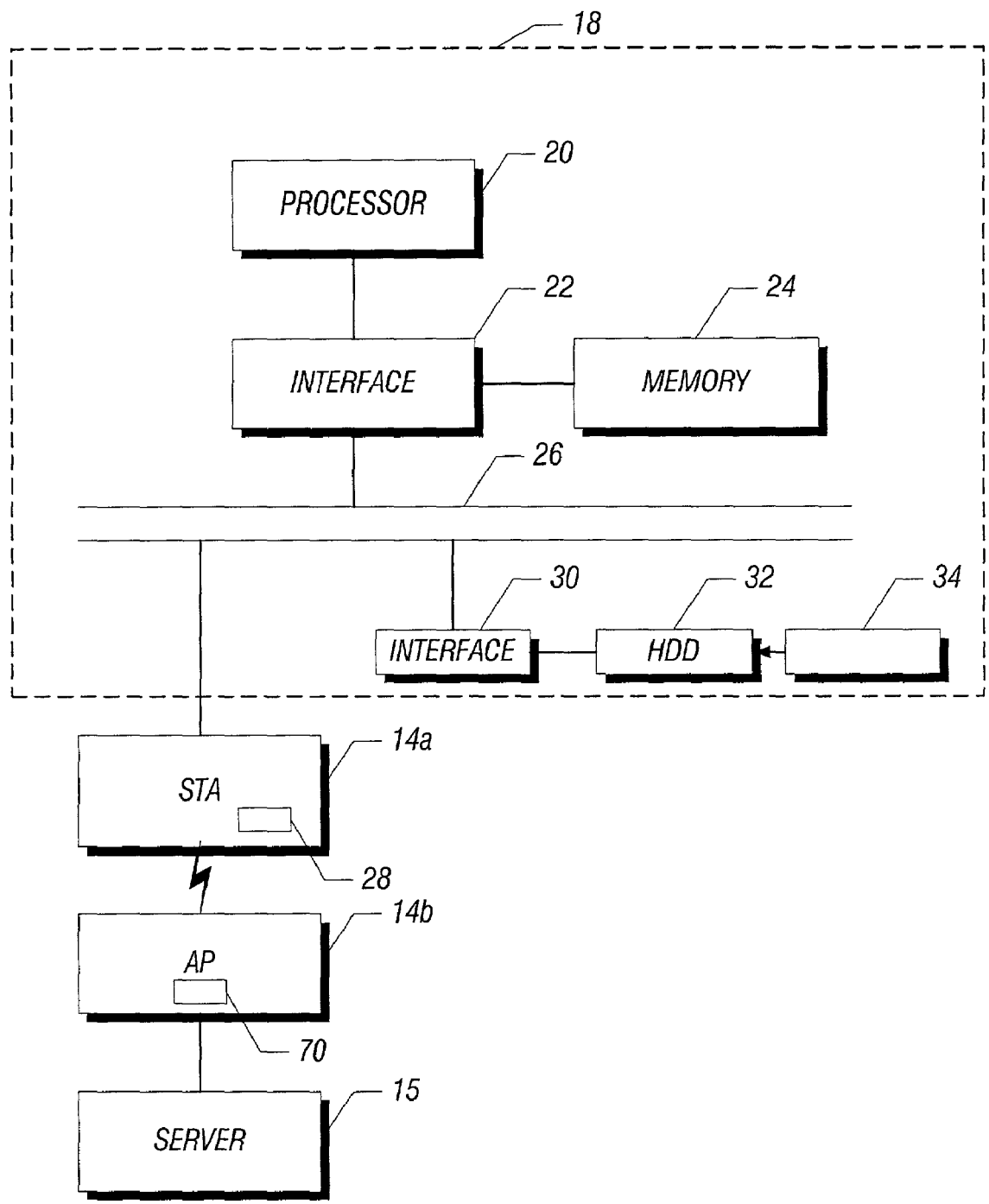
FIG. 2 is a depiction of a host in accordance with one embodiment of the present invention.

Referring to FIG. 2, the station 14a may communicate with the station 14b that acts as an access point (AP). The station 14a may be associated with a host 18 that in some embodiments may be a processor-based system including a processor 20, an interface 22 and a memory 24. The interface 22, in some embodiments, may be coupled to a bus 26 that receives the station 14a. For example, in one embodiment, the station 14a may be a network interface card (NIC) that is plugged into the bus 26. In another embodiment the station 14a is an access point as well.

The bus 26 may also support an interface 30 that is coupled to a hard disk drive 32. The drive 32 may in turn store a software program 34.

The access point 14b may be coupled over a wired network to a server 15 in one embodiment. The access point may store software 70 and may be a processor-based system in one embodiment. The station 14a may be a processor-based system and may store the software 28 in one embodiment of the present invention.

Figure 3:
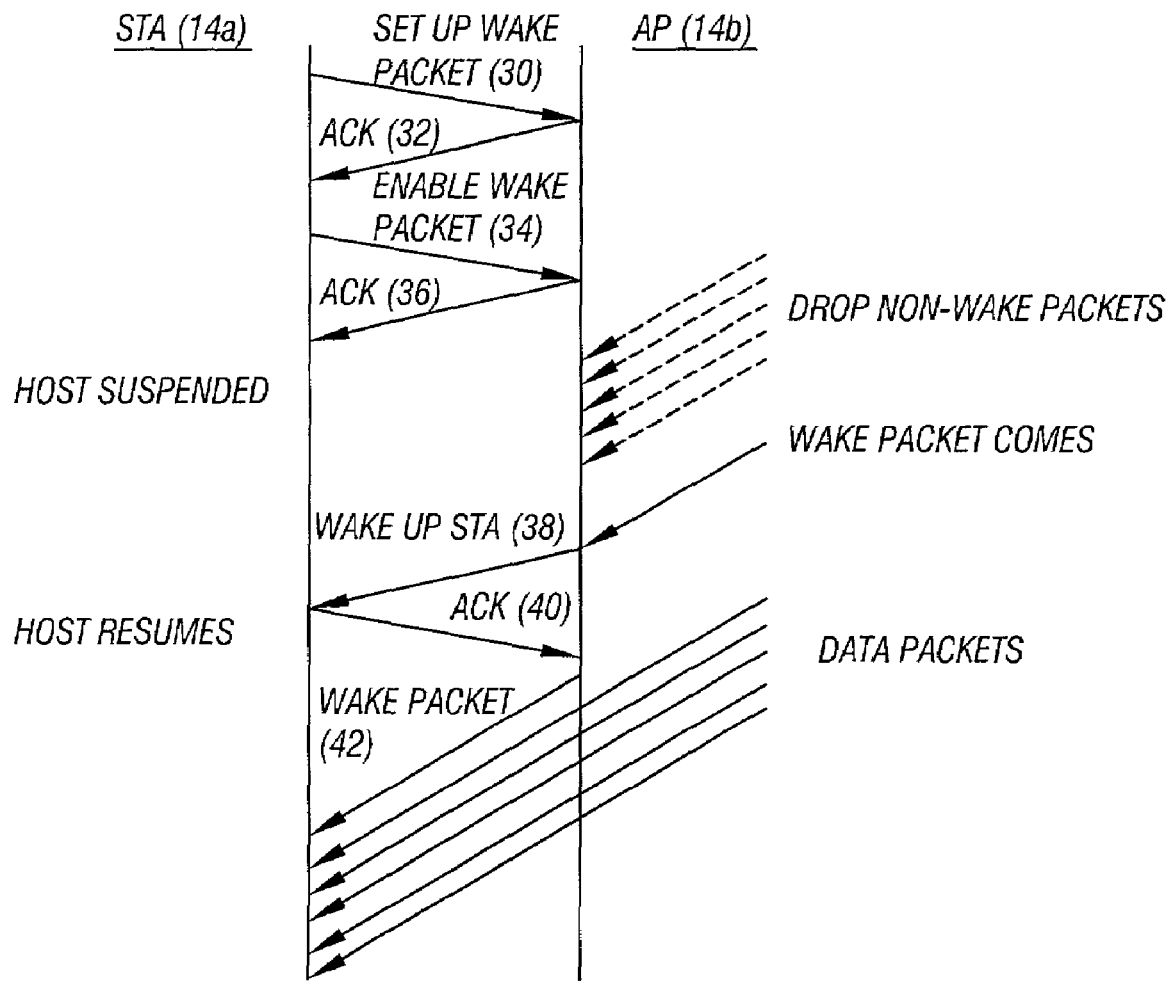
FIG. 3 is a chart that depicts the operation of one embodiment of the present invention.

Referring to FIG. 3, wireless communications may occur between the access point 14b and the station 14a in response to information conveyed over a wired network from the server 15. In some embodiments, the host 18 may be a portable processor-based system or other power sensitive system. Thus, in some cases, the host 18 may enter reduced power consumption modes wherein its processing capabilities may be reduced. However in such modes, the power consumption of the host 18 may also be reduced.

When the host 18 is in the reduced power consumption state, it may be unnecessarily awakened from that state by the receipt of relatively unimportant packets sent, for example, by the server 15. Each time such a packet 15 arrives, absent appropriate filtering, the host 18 may be awakened, causing the host 18 to transition to a higher power consumption state. Such transitions may effectively increase the power consumption of the host 18. In battery powered applications, this reduces the useful life between battery charges of the host 18, reducing its desirability and performance.

As shown in FIG. 3, a wake packet filtering protocol, implemented on the access point 14b, filters unnecessary packets that would unnecessarily awaken the host 18, causing the host 18 to transition unnecessarily to an increased power consumption state.

Initially, the station 14a sends a setup wake packet 30 to the access point 14b. The access point 14b provides an acknowledgment (ACK) 32 to the station 14a. The setup wake packet 30 provides the information needed by the access point 14b to determine which packets are of sufficient importance to involve the host 18. Thus, a filtering protocol may be provided from the station 14a to the access point 14b to enable the access point 14b to determine, while the host 18 is in a sleep or reduced power consumption mode, whether to awaken the host 18 in order to process an incoming packet. This information may be received by the station 14a from the host 18 and particularly the processor 20. The station 14a may then enable the wake packet filtering function on the access point 14b as indicated at 34, and this enable message may be acknowledged as indicated at 36.

Once the host 18 goes into a reduced power consumption mode ("Host Suspended"), any packets ("Non-Wake Packets") that arrive at the access point 14b from the server 15 that do not meet the criteria provided by the host 18 for awakening the host 18 are simply dropped in one embodiment. When a wake packet arrives ("Wake Packet Comes") the station is awakened as indicated at 38. A wake packet is a packet that meets the criteria provided by the host 18 for awakening the host when the host is in a reduced power consumption mode. In response to the wake up call from the access point 14b, a host 18 is awakened by the station 14a. The station 14a acknowledges the wake up call as indicated at 40. The host 18 then receives the data packets included with the communication from the server 15 as indicated at 42.

Figure 4:
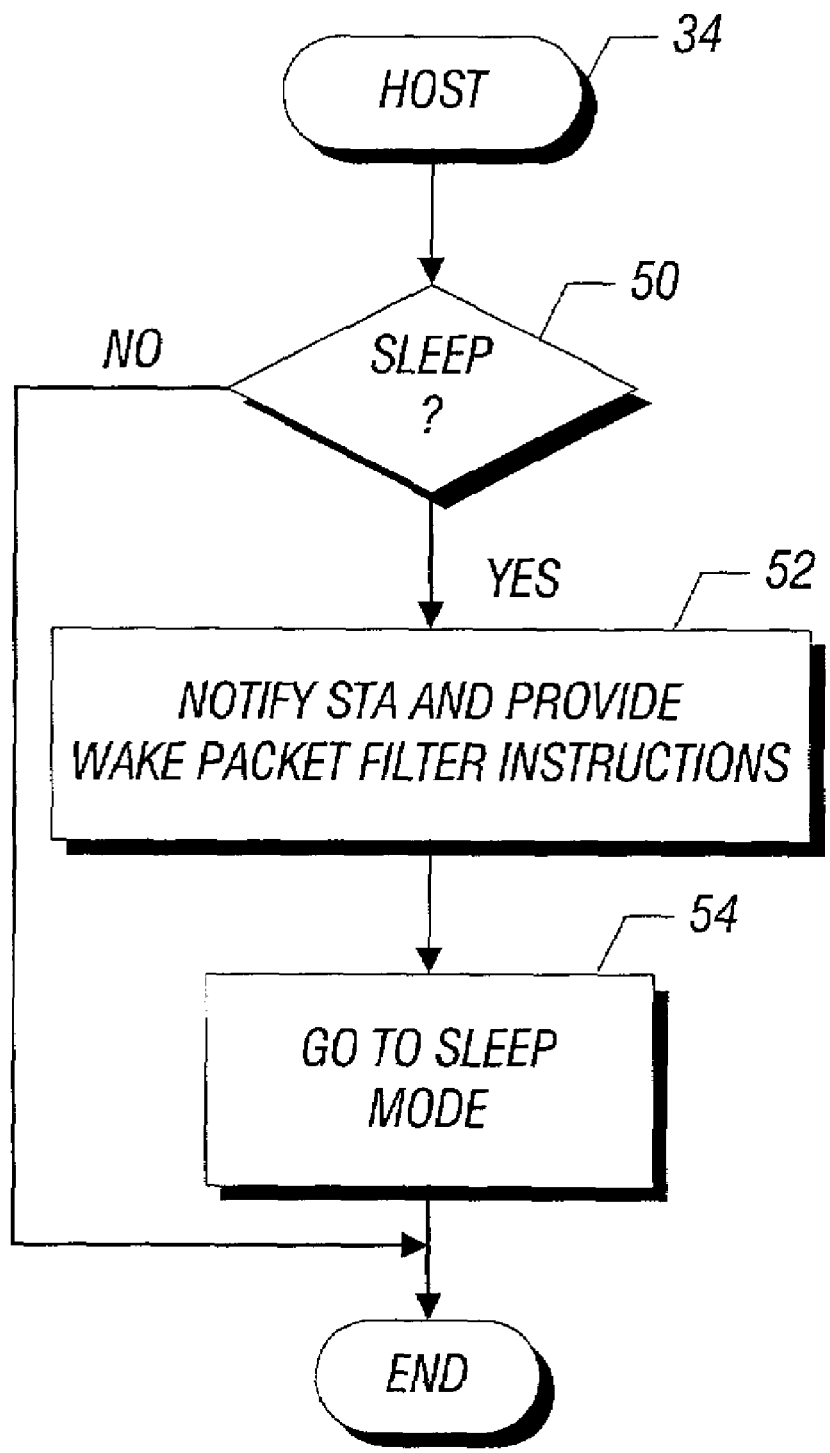
FIG. 4 is a flow chart for software for the host shown in FIG. 2 in accordance with one embodiment of the present invention.

Referring to FIG. 4, in one embodiment, the software 34 stored on the host 18 initially determines whether the host desires to go into a sleep or reduced power consumption mode as indicated at diamond 50. If so, the host 18 notifies the station 14 and provides the appropriate wake packet filter instructions as indicated in block 52. The host 34 then goes to the sleep mode as indicated in block 54.

Figure 5:
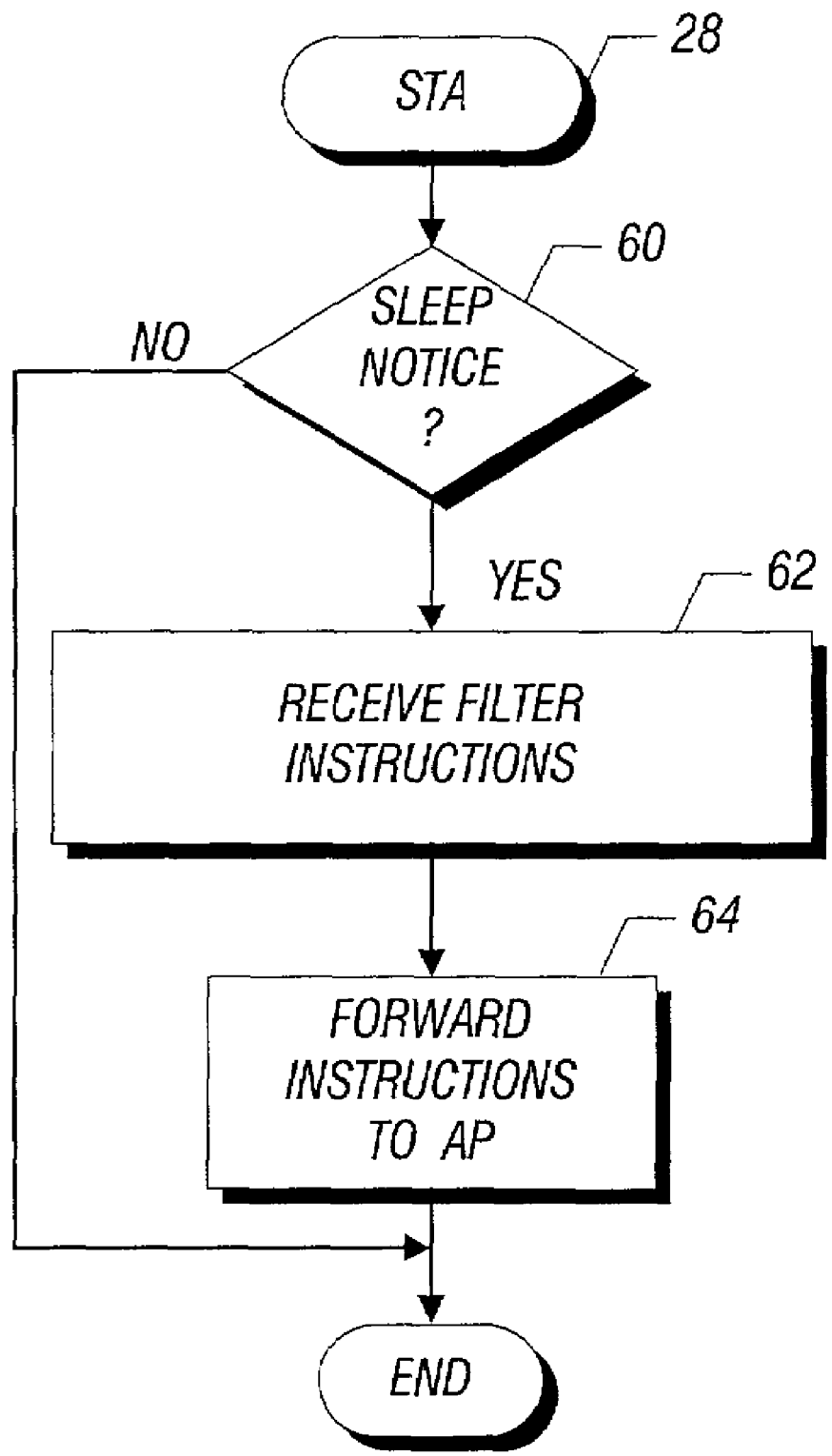
FIG. 5 is a flow chart for software for the station shown in FIG. 2 in accordance with one embodiment of the present invention.

Referring to FIG. 5, in one embodiment, the station software 28 initially determines whether a notice has been received from the host 18 that the host intends to enter a reduced power consumption mode, as determined in diamond 60. If so, the station receives the wake packet filtering instructions as indicated in block 62. The station then forwards those instructions to the access point as indicated in block 64.

Figure 6:
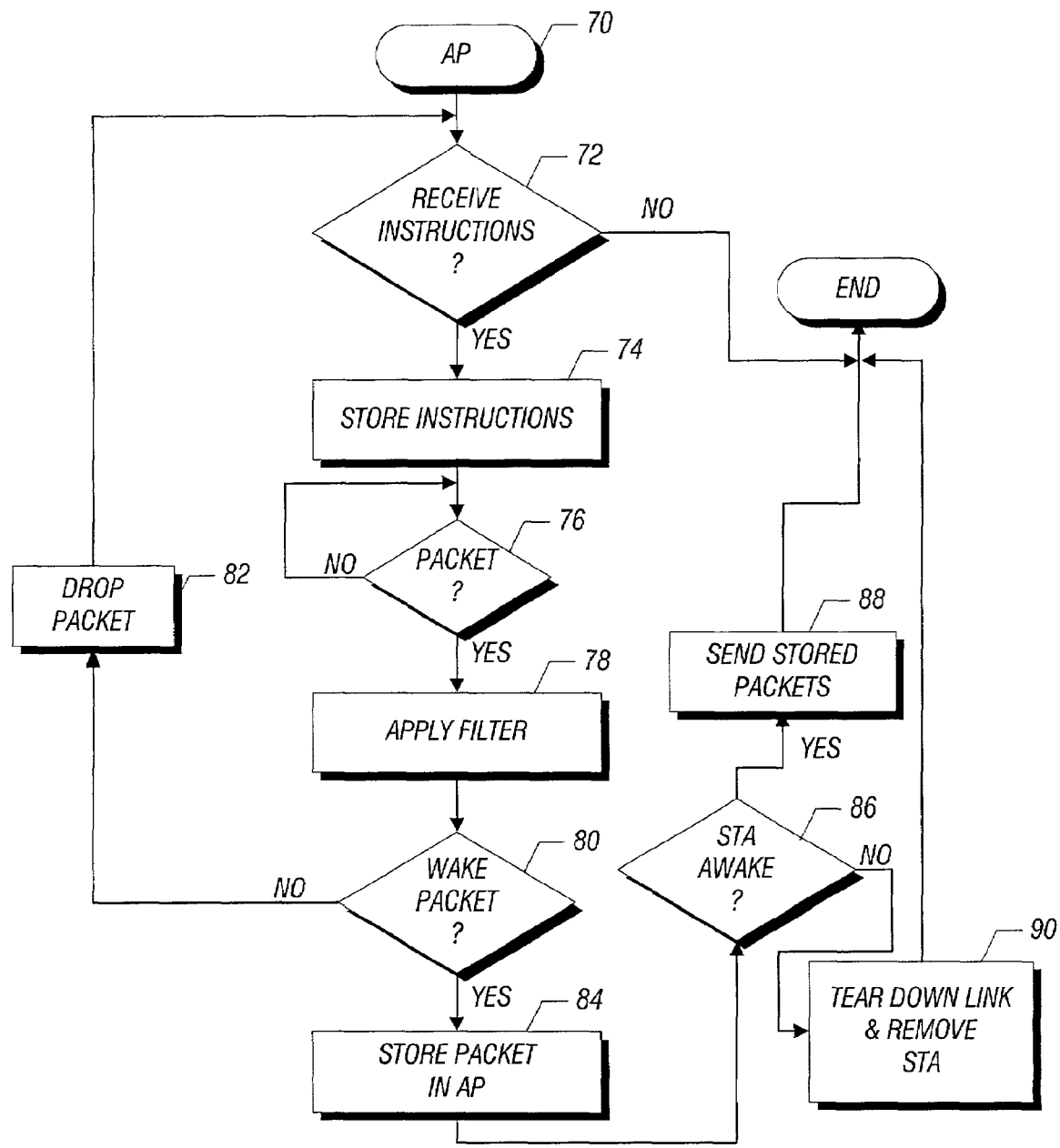
FIG. 6 is a flow chart for software for an access point shown in FIG. 2, in accordance with one embodiment of the present invention.

Turning finally to FIG. 6, the access point software 70, in accordance with one embodiment of the present invention, determines whether it has received wake packet filtering instructions as indicated in diamond 72. If not, after a time out, the flow ends. If the instructions have been received, those instructions may be stored as indicated in block 74. When a packet arrives at the access point, for example over the network from the server 15, the filtering instructions are applied, as indicated in block 78.

A check at diamond 80 determines whether the packet is a wake packet meaning that it is a packet which necessitates reviving the host 18. If not, in some embodiments, the packet may simply be dropped as indicated in block 82.

If the packet is a wake packet, the packet is stored in the access point 14b temporarily as indicated in block 84 in one embodiment. A check at diamond 86 determines whether the station 14a has been awakened. If so, the stored packet is sent to the station 14a which in turn transfers the packet or packets to the host 18. If the station cannot be awakened, for example, after a suitable time out period as determined in diamond 86, communication has apparently been lost between the access point and the station. Therefore, the corresponding link is torn down and the station is removed from the list of active stations with which the access point communicates, as indicated in block 90.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   providing an access point in a wireless network with wake packet filtering instructions;
   enabling an access point to wirelessly receive a packet; and
   enabling said access point to determine, using said wake packet filtering instructions, whether to awaken a host.

2. The method of claim 1 including receiving the instructions from a station coupled to the host.

3. The method of claim 2 including wirelessly receiving said instructions.

4. The method of claim 1 including receiving information that to host intends to transition to a reduced power consumption mode.

5. The method of claim 4 including receiving a packet and determining whether the packet is one which merits awakening the host.

6. The method of claim 5 including, if the packet is a wake packet, notifying a station coupled to said host.

7. The method of claim 6 including storing a wake packet in the access point until the station awakens.

8. The method of claim 7 including enabling the station to awaken the host in response to a communication from the access point.

9. The method of claim including receiving a wake packet from a server over a wired network.

10. The method of claim 1 including dropping packets that do not meet the criteria for awakening the host.

11. An article comprising a computer-readable medium storing program instructions that, if executed, enable a processor-based system to perform the steps of:
    providing distribution services;
    receiving wake packet filtering instructions from a host before the host transitions to a reduced power consumption state;
    receiving a wireless packet; and
    applying said wake packet filtering instructions to said packet to detennine whether to awaken the host.

12. The article of claim 11 further storing instructions that enable a processor-based system to perform the step of receiving instructions from a station coupled to the host.

13. The article of claim 12 further storing instructions that enable the processor-based system to perform the step of wirelessly receiving information that the host intends to transition to a reduced power consumption mode.

14. The article of claim 13 further storing instructions that enable a processor-based system to perform the step of receiving a packet and determining whether the packet is one which merits awakening the host.

15. The article of claim 14 further storing instructions that enable a processor-based system to perform the step of notifying a station coupled to the host if a received packet is a packet that merits waking the host.

16. The article of claim 15 further storing instructions that enable a processor-based based system to perform the step of storing a packet until the station awakens.

17. The article of claim 16 tbrther storing instructions that enable the processor-based based system to perform the step of enabling the station to awaken the host in response to a communication.

18. The article of claim 11 further storing instructions tat enable a processor-based system to perform the step of receiving a packet from a server over a wired network.

19. The article of claim 11 further storing instructions that enable the processor-based system to perform the step of dropping packets that do not meet criteria for awakening the host.

20. An access paint comprising:
a processor, and
a storage, coupled to said processor, storing instructions that enable the processor to receive wake packet filtering instructions from a host before the host transitions to a reduced power consumption state, receive a wireless packet and apply said wake packet filtering instructions to said packet to determine whether to awaken the host.

21. The access point of claim 20 wherein said storage stores instructions that enable the access point to receive instructions from a station coupled to the host.

22. The access point of claim 21 wherein said access point receives a packet, applies said filtering instructions and determines whether to awaken the host.

23. The access point of claim 22 wherein said storage stores a packet until the host awakens.

24. The access point of claim 20 wherein said access point awakens the host from a reduced power consumption mode when a packet arrives that meets criteria supplied by the host for determining whether to awaken the host.

25. A processor-based system comprising:
a processor;
a storage coupled to said processor;
a bus coupled to said processor, and
a station coupled to said bus to receive wireless packets, said station acting as an access point, said access point to receive wake packet filtering instructions from a host before the host transitions to a reduced power consumption state and to apply the wake packet filtering instructions to determine whether to awaken the host in response to the receipt of a wireless packet.

26. The system of claim 25 wherein said system is a battery powered system.

27. The system of claim 25 wherein said station is a network interface card.

28. The system of claim 27 wherein said network interface card is directly coupled to a wired network.

29. The system of claim 27 wherein said access point stores a packet until the system is ready to receive the packet.

* * * * *

UNITED STATES PATENT AND TRADEMARK OFFICE
CERTIFICATE OF CORRECTION

PATENT NO. : 7,133,374 B2 Page 1 of 1
APPLICATION NO. : 10/101042
DATED : November 7, 2006
INVENTOR(S) : Steve C. Lo, Jeffrey L. Huckins and Duncan M. Kitchin It is certified that error appears in the above-identified patent and that said Letters Patent is hereby corrected as shown below:

Column 4:
Line 20, "to host" should be --the host--;
Line 45, "detennine" should be --determine--;
Line 64, "tbrther" should be --further--;
Line 54: "processor-based based" should be --processor-based--.

Column 5:
Line 1, "tat" should be --that--;
Line 8, "paint" should be --point--.

Signed and Sealed this

Second Day of January, 2007

JON W. DUDAS
*Director of the United States Patent and Trademark Office*